Jan. 10, 1950 E. J. GRAY 2,493,962
FLUID CONTROL AND BY-PASS TOOL
Filed Sept. 23, 1946 3 Sheets-Sheet 1

INVENTOR.
EVERETT J. GRAY.
BY
ATTORNEYS.

Jan. 10, 1950 E. J. GRAY 2,493,962
FLUID CONTROL AND BY-PASS TOOL
Filed Sept. 23, 1946 3 Sheets-Sheet 2
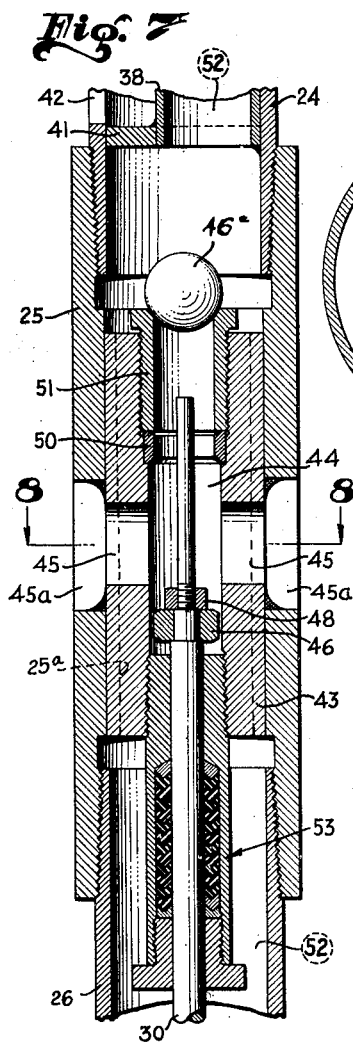
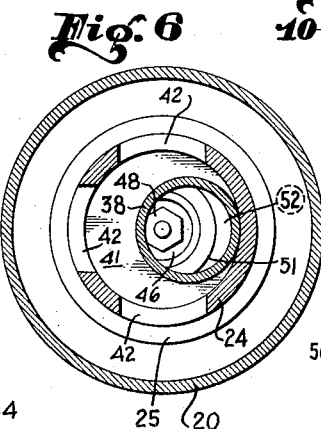
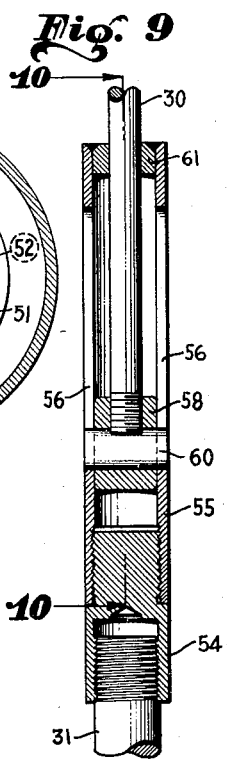
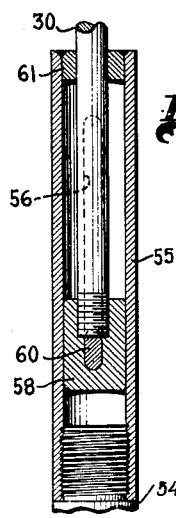
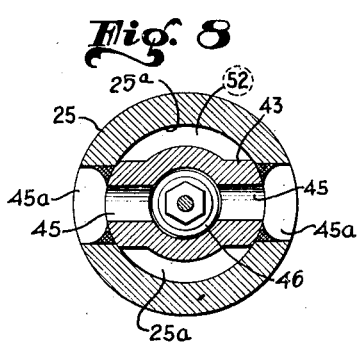
INVENTOR.
EVERETT J. GRAY.
BY
*Huebner Maltby & Bechler*
ATTORNEYS.

Jan. 10, 1950 E. J. GRAY 2,493,962
FLUID CONTROL AND BY-PASS TOOL
Filed Sept. 23, 1946 3 Sheets-Sheet 3

INVENTOR.
EVERETT J. GRAY.
BY
Huebner Maloby + Bechler
ATTORNEYS.

Patented Jan. 10, 1950

2,493,962

UNITED STATES PATENT OFFICE 2,493,962

FLUID CONTROL AND BY-PASS TOOL

Everett J. Gray, San Dimas, Calif., assignor, by mesne assignments, to John B. Hitchings, Long Beach, Calif.

Application September 23, 1946, Serial No. 698,794

9 Claims. (Cl. 166—11)

This invention relates to tools for operation in wells, such as oil or gas wells, having a tubular liner or casing.

The general object and purpose of this invention is to provide a well tool for operations in and about a packed off zone in the well casing, such as a perforated zone, wherein a fluid pressure within the zone may be desired or wherein a fluid flow into or out of the zone may be desired, the flow being selectively controlled with respect to a tubular pipe or stringer to which the tool may be secured, provision being made for a fluid flow by-passing one or both of the packers which, together with the casing, form the chamber containing the perforated zone thereof.

The invention contemplates the provision of valve means actuatable by appropriate manipulation of the tubing or stringer to control the fluid flow between the above mentioned chamber and the by-pass, and also means for controlling the fluid flow in the by-pass itself, also actuatable by suitable manipulation of the tubing or stringer.

A more specific object of the invention is to provide a tool for controlling fluid operations within a well casing which may be lowered into the casing to a desired position and form a packed off zone or chamber such that a fluid flow into or out of the chamber, from or to a tubing or pipe stringer system, may be effected and controlled by valve means selectively actuated by shifting of the tool longitudinally in a well casing or by the rotation of the tool from its pipe stringer suspension means.

Another object of the invention is to provide a well tool adapted to be lowered into a well casing from a pipe or tube system and having spaced packers forming a chamber together with a portion of the well casing, in which chamber a fluid flow may be provided to or from the tube system or from the free fluid area external thereto and having by-pass means for the packers provided with valve means for controlling the flow from the by-pass below the lowermost packer, and valve means for controlling the fluid flow between the by-pass and the chamber mentioned.

A further object of the invention is to provide a well tool having spaced packers adapted to form a compression chamber together with a portion of the well casing, in which chamber various well treating operations, such as cementing, acidizing, testing, or washing, may be performed without requiring alterations or adjustments in the tool which usually require removal of the tool from the casing in order to be done.

Other objects and advantages will appear and be brought out more fully in the following specification considered with reference to the accompany drawings throughout which like parts are designated by like numerals.

In the drawings:

Figure 6 is a sectional view taken along the line 6—6 of Figure 2.

Figure 7 is an enlarged view in sectional elevation showing the by-pass valve structure of Figures 1 to 5.

Figure 8 is a sectional view taken along the line 8—8 of Figure 7.

Figure 9 is an enlarged view in section showing the lost-motion means interconnecting the valve rods.

Figure 10 is a sectional view taken along the line 10—10 of Figure 9.

Figures 1, 2, 3, 4, 5:
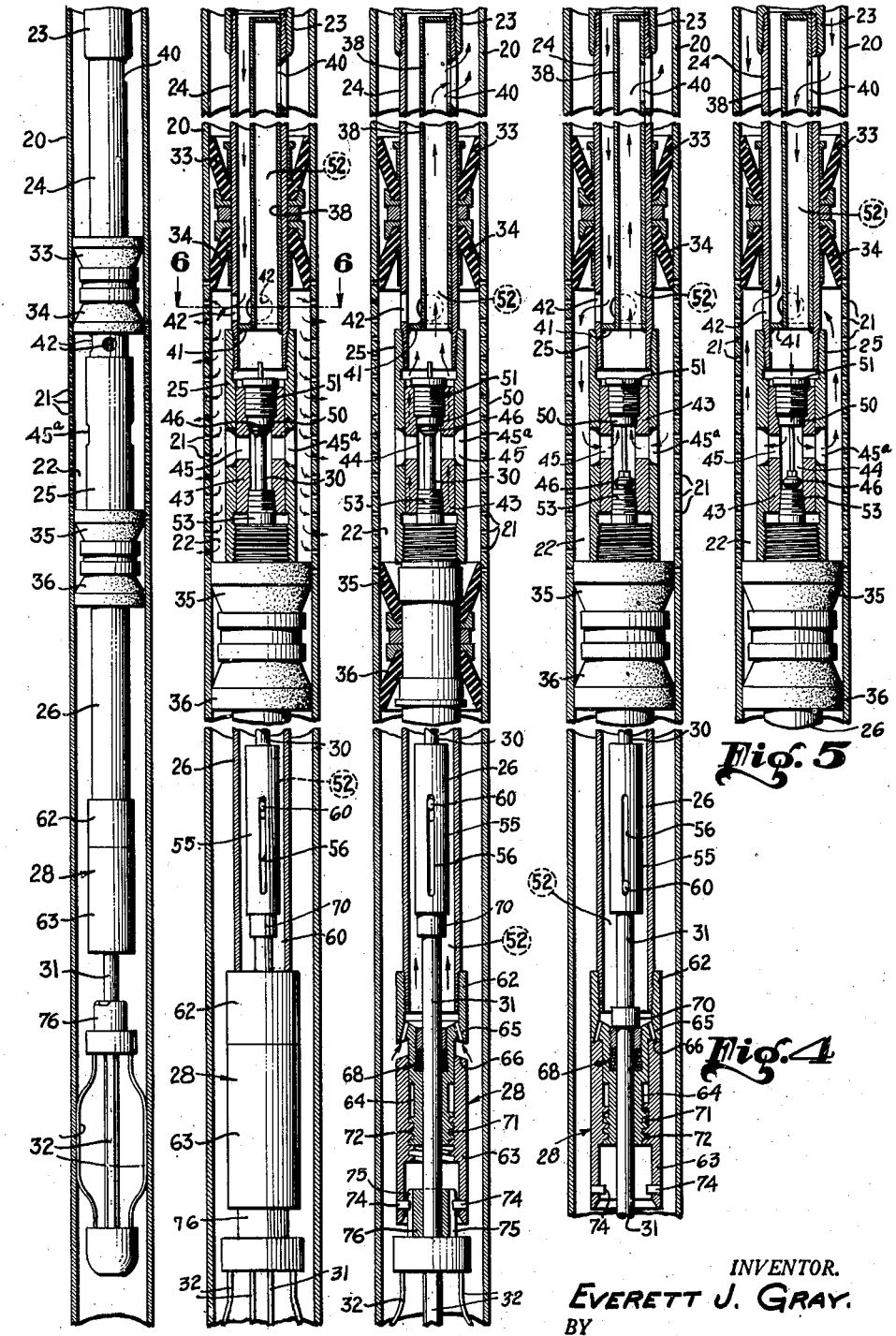
Figure 1 is an elevation view of the tool shown in a well pipe or casing.
Figure 2 is an enlarged view of the same, partly in section, showing the by-pass valve in closed or cementing position.
Figure 3 is a view of the tool while being lowered in the casing and showing the foot valve open and the by-pass valve closed.
Figure 4 is a view similar to Figure 1 showing the foot valve closed and the by-pass valve in open position for normal circulation.
Figure 5 is a partial view similar to Figure 4 showing the by-pass valve in open position and the direction of fluid flow reversed for reverse circulation or back scuttling.

Referring more particularly to the drawings, I show a well pipe or casing 20, such as a casing of an oil or gas well, the casing having a plurality of perforations 21, through which perforations it may be desired to cause a fluid flow under pressure, such as for cementing, acidizing, testing or washing, the interior of the casing forming an annular pressure chamber or space 22 between packers on the tool of my invention.

The tool of this invention is shown in connection with and as being secured to a coupling 23 of a drill string. However, in the following description the drill string may be designated by the numeral 23, the coupling shown in the several figures. The tool of the present invention comprises an upper mandrel 24, a bypass valve sleeve 25, a lower mandrel 26, and a foot valve assembly 28. A by-pass valve stem 30 extends into lower mandrel 26 from valve sleeve 25 and is connected to a foot valve stem 31 which extends through the foot valve assembly 28. A plurality of belly springs 32 are secured at the lower end of foot valve stem 31 and frictionally engage the inner wall of casing 20 to retard the movement of the valve stems during the movements of the tool into and out of the well, and for opening or closing the valves when desired.

A pair of packing cups 33 and 34 are suitably secured on upper mandrel 24 and similar packing cups 35 and 36 are secured on lower mandrel 26, packing cups 33 and 35 facing upwardly and cups 34 and 36 facing downwardly, whereby to provide pressure thereabove or therebelow or between cups 34 and 35 to constitute pressure chamber 22, already referred to.

A by-pass pipe 38 is suitably secured in upper mandrel 24 and has a closed upper end, a port 40 being provided near the upper end in registry with an opening in the side wall of mandrel 24. The lower end of pipe 38 is open and communicates with the interior of mandrel 24 below a fillet or plug 41 which closes off the bore of mandrel 24 adjacent and below a plurality of ports 42 in the wall of the mandrel.

A valve body comprising in part a valve sleeve 25 is provided with an insert or valve structure 43, Fig. 7, which is suitably secured therein in any suitable manner, such as by pressed fit, welding, or otherwise, and has a valve passage or vertical bore 44 and a diametrically arranged pair of ports or passages 45 which register with openings 45a in the wall of sleeve 25. A by-pass valve 46 is suitably secured, as by lock nut 48, on valve stem 30 and positioned in bore 44. A valve seating ring 50 is secured in the upper portion of bore 44 and is held by a suitable threaded sleeve 51, or otherwise. The valve structure is such that a by-pass passageway is provided and indicated by the numeral 52 and includes the spaces or passages 25a within valve sleeve 25 external to insert 43 (see Figure 8), by-pass pipe 38 and its corresponding by-pass passage or duct, port 40, and the bore or passage of lower mandrel 26, together with passages 65 in the foot valve structure, to be described more fully hereinafter.

A packing gland 53 is suitably provided for valve stem 30 (Figure 7) and may be of any conventional construction. When valve 46 is closed against seat 50, a by-pass connection is thus provided between the free fluid area above packer 33 and the fluid area below packer 36 when the foot valve 28 is open in the manner to be presently described. Thus chamber 22 may be maintained under pressure, the pressure being controlled by the fluid in upper mandrel 24 and drill string 23. When valve 46 is open a communication is provided between pressure chamber 22 and the by-pass passage 52.

A coupling 54 is suitably secured, as by a threaded connection or otherwise, to the upper end of foot valve stem 31, and a sleeve 55 may be similarly secured to coupling 54. The sleeve 55 has a pair of diametrically disposed slots 56 and a slide block 58 is reciprocably disposed within the sleeve and secures a pin 60 which extends through the block and into slots 56.

Valve stem 30 is suitably secured to block 58 and extends through a bearing collar 61 secured within the upper end of sleeve 55. By this construction, valve 46 may be shifted between closed position against valve seat 50 and open position, as shown in Figure 7, by manipulation of the drill string to move the valve sleeve 25, the valve stems 30 and 31 normally being held against vertical movement relative to the casing 20 by belly springs 32, as will be apparent to those skilled in the art.

Figure 11:
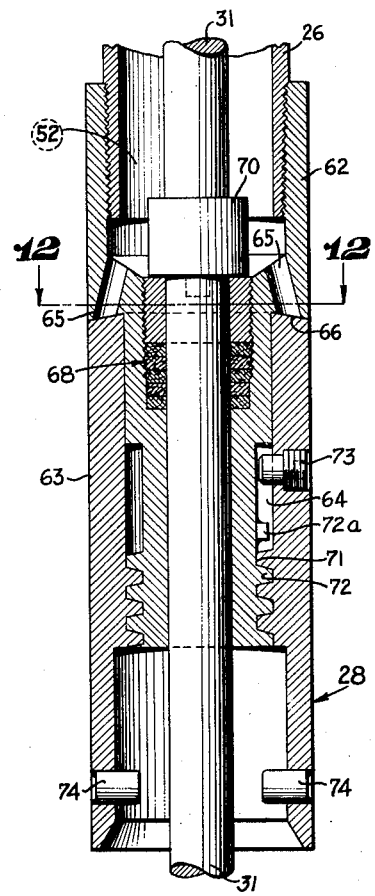
Figure 11 is an enlarged sectional elevation view showing the foot valve structure.

Foot valve 28 is shown in elevation in Figures 1 and 2, and in section in Figures 3, 4 and 11, and comprises a member 62 having a threaded connection with lower mandrel 26, and a sleeve member 63 having a bore 64 through which a reduced diameter portion of member 62 extends. A plurality of ports or passages 65 are provided in member 62 and extend from the interior to the exterior thereof adjacent an annular shouldered end 66 of sleeve member 63, such that when members 62 and 63 are in close engagement, as shown in Figures 4 and 11, passages 65 are closed, the passages being opened when these members are in extended position, as shown in Figure 3. The by-pass passage 52, mentioned above, includes passages 65 when open as mentioned.

A packing gland 68 of any conventional construction is provided for foot valve stem 31 and a stop collar 70 is secured on stem 31 to prevent valve 46 from hammer action against the sleeve of packing gland 53 when the valve is shifted to open position, as shown in Figures 4, 5 and 7. Sleeve member 63 is formed with internal threads 71, and member 62 is formed with complementary external threads 72, and a stop abutment 72a which is adapted to engage a pin 73 which extends radially inwardly into the bore of sleeve 63. This pin and stop prevent freezing of the engagement of threads 71 and 72 at the limit of the movement of the member 62 upwardly when ports 65 are opened.

Member 63 has a bore portion below threads 71 and a pair of pins 74 extend inwardly therein for engagement with a pair of slots 75 formed in a collar 76 secured to foot valve stem 31, whereby sleeve member 63 may be held against rotation when it is desired to rotate the drill string to raise or lower foot valve member 62 to open or close ports 65.

By-pass valve 46 may be shifted between open and closed position by raising or lowering the drill string 23, the movement of the valve 46 being retarded by the frictional engagement between belly springs 32 and the casing 20 according to well understood practice. The foot valve 28 may be opened and closed in the following manner. The drill string 23 is lowered and rotated a sufficient amount for pins 74 to enter slots 75 of collar 76 and, upon further rotation of the string left-handedly, member 62 will be moved upwardly with respect to member 63 until stop abutment 72a engages pin 73 limiting this movement, whereupon the lower end of passage 65 will be separated or spaced from shoulder 66 and thus the by-pass passage 52 will be opened from the free fluid area above packer 33 to the fluid area below packer 36. The foot valve 28 may be actuated to closed position by reversing these steps as should be obvious. The by-pass valve 46 may be operated between closed and open positions while the foot valve is either open or closed.

Figure 13:
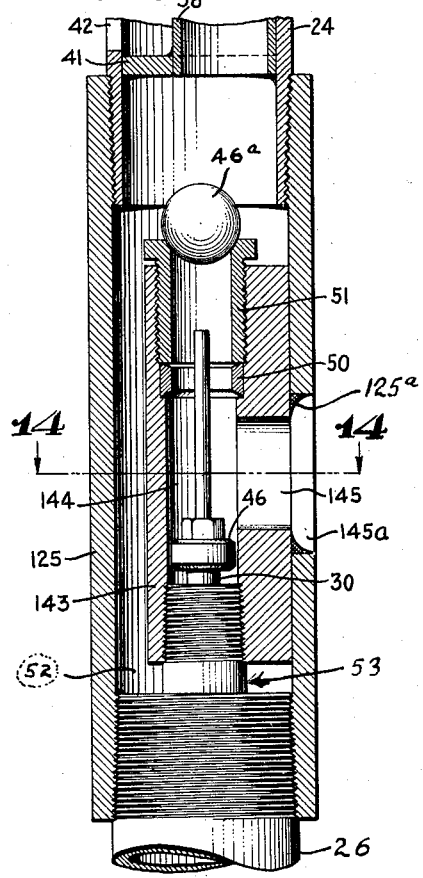
Figure 13 is a view similar to Figure 7 showing a modified form of the by-pass valve.
Figure 12:
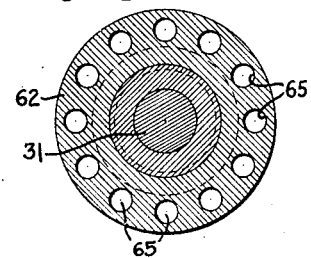
Figure 12 is a sectional view taken along the line 12—12 of Figure 11.
Figure 14:
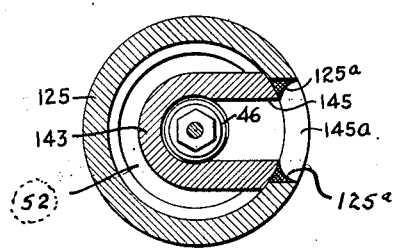
Figure 14 is a sectional view taken along the line 14—14 of Figure 13.

In Figures 13 and 14, I show a modified form of by-pass valve structure. In these figures, I show a valve sleeve 125 positioned and secured between mandrels 24 and 26 and having a valve body 143 secured therein, the valve body having a bore 144 and a laterally disposed bore 145 which registers with an opening 145a in the wall of sleeve 125. Opening 145a may be somewhat larger than opening 145, whereby valve body 143 may be secured as by welding 125a to valve sleeve 125. The remainder of the valve structure, including the valve rod 30, valve 46, seat 50 and packing gland 53, is the same as that shown in Figures 1 to 3. An enlarged by-pass passage 52 is thus provided within valve sleeve 125 and a more efficient fluid flow is provided by this form of by-pass valve structure.

In Figure 7 I show an optional check valve feature which comprises a ball vavle 46a adapted to seat on the upper end of valve sleeve 51 and adapted to be unseated by the upper end of valve stem 30 when in a raised position. For certain uses it may be desirable to permit a flow from chamber 22 through passage 45 (or passage 145) and thence upwardly through by-pass pipe 38 and into the free fluid area above packer 33 with a reverse flow checked by ball valve 46a.

In the operation of the invention the tool is lowered in the valve casing 20 to the desired position so as to provide pressure chamber 22 which may be for a cementing operation, such as cementing perforations 21. During the normal lowering movement of the tool in the well casing, the valve stems 30 and 31 will, because of the drag of belly springs 32, cause valve 46 to be seated against valve seat 50 and string 23 will maintain any fluid therein, such as acid or cement, which fluid can, by suitable increase in pressure in the string, be forced into and through the perforations 21.

If it is desired to wash out this fluid, valve 46 may be opened and, by continued pressure, this fluid may be forced upwardly through by-pass pipe 38 and the free fluid area in casing 20 above packer 33, as shown in Figure 4. If a reverse flow or back scuttling operation is desired, such a flow can be provided as indicated by the arrows in Figure 5. Foot valve 28 may be kept closed during these operations, whereby the fluid in the area below packer 36 is kept from mixing with the fluids in string 23 and chamber 22, as will be apparent.

When lowering the tool into the well or raising it, and a fluid is maintained in the casing through which the tool must be passed, the by-pass 28 may be opened and the by-pass passage 52 will permit the tool to be so moved without resistance from the fluid column in the casing, the position for the valves being as shown in Figure 3.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices and systems.

Having thus described my invention, what I claim and desire to secure by Letters Patent is:

1. A fluid control tool for a well casing, comprising: a pair of tubular mandrels; a valve body including a housing disposed between and connected with said mandrels and having a valve passage; a valve seat intermediate the ends of said valve passage; a valve member cooperable with said valve seat adapted to open and close said valve passage; means for moving said valve member relative to said valve seat; packers on the respective mandrels cooperable with a well casing to provide a space forming an annular chamber therebetween surrounding said valve housing; means in said tool establishing communication between the interior of one of said mandrels and said valve passage on one side of said valve seat and the exterior of said one mandrel at the side of the packer thereon remote from said annular chamber; the other of said mandrels having a passage opening into and in direct communication with said annular chamber; and a by-pass duct in said other mandrel in communication with said valve passage on said one side of said valve seat and also communicating with the exterior of said other mandrel at the side of the packer thereon remote from said annular chamber, said valve housing having a port establishing communication between said valve passage and said annular chamber on the side of said valve seat remote from said by-pass duct.

2. A fluid control tool for a well casing, comprising: a pair of tubular mandrels; a valve body including a housing disposed between and connected with said mandrels and having a valve passage; a valve seat intermediate the ends of said valve passage; a valve member cooperable with said valve seat adapted to open and close said valve passage; means for moving said valve member relative to said valve seat; packers on the respective mandrels cooperable with a well casing to provide a space forming an annular chamber therebetween surrounding said valve housing; passage means in said housing establishing communication between the interior of one of said mandrels and said valve passage on one side of said valve seat; valve means for establishing and interrupting communication between said interior and the exterior of said one mandrel at the side of the packer thereon remote from said annular chamber; means for actuating said valve means, the other of said mandrels having a passage opening into and in direct communication with said annular chamber; and a by-pass duct in said other mandrel in communication with said valve passage on said one side of said valve seat and also communicating with the exterior of said other mandrel at the side of the packer thereon remote from said annular space, said valve housing having a port establishing communication between said valve passage and said annular space on the side of said valve seat remote from said by-pass duct.

3. A fluid control tool for a well casing, comprising: a pair of tubular mandrels; a valve body including a housing disposed between and connected with said mandrels and having a valve passage; a valve seat intermediate the ends of said valve passage; a valve member cooperable with said valve seat adapted to open and close said valve passage; packers on the respective mandrels cooperable with a well casing to provide a space forming an annular chamber therebetween surrounding said valve housing; means in said tool establishing communication between the interior of one of said mandrels and said valve passage on one side of said valve seat and the exterior of said one mandrel at the side of the packer thereon remote from said annular chamber; the other of said mandrels having a passage opening into and in direct communication with said annular chamber; a by-pass duct in said other mandrel in communication with said valve passage on said one side of said valve seat and also communicating with the exterior of said other mandrel at the side of the packer thereon remote from said annular chamber, said valve housing having a port establishing communication between said valve passage and said annular chamber on the side of said valve seat remote from said by-pass duct; and stem means connected with said valve member extending to a position exteriorly of said tool adapted to frictionally contact with the interior of the well casing, said stem means being operative upon relative movement between said tool and well casing to restrain movement of said valve member relative to the remainder of said tool to thus effect opening and closing of said valve.

4. A fluid control tool for a well casing, comprising: a pair of tubular mandrels; a valve body including a housing disposed between and connected with said mandrels and having a valve passage; a valve seat intermediate the ends of said valve passage; a valve member cooperable with said valve seat adapted to open and close said valve passage; means for moving said valve member relative to said valve seat; packers on the respective mandrels cooperable with a well casing to provide a space forming an annular chamber therebetween surrounding said valve housing; means in said tool establishing communication between the interior of one of said mandrels and said valve passage on one side of said valve seat and the exterior of said one mandrel at the side of the packer thereon remote from said annular chamber; the other of said mandrels having a passage opening into and in direct communication with said annular chamber; a by-pass duct in said other mandrel in communication with said valve passage on said one side of said valve seat and also communicating with the exterior of said other mandrel at the side of the packer thereon remote from said annular chamber, said valve housing having a port establishing communication between said valve passage and said annular chamber on the side of said valve seat remote from said by-pass duct; valve means controlling communication between the interior and the exterior of said one mandrel; and means for actuating said valve means including a member located exteriorly of said tool and adapted to frictionally engage with the interior of the well casing, said last-mentioned means being operative, when relative movement is instituted between the tool and the casing, to effect opening and closing of said valve means.

5. A fluid control tool for a well casing, comprising: an upper tubular mandrel and a lower tubular mandrel; a valve body including a housing disposed between and connected with said mandrels and having a valve passage; a valve seat intermediate the ends of said valve passage; a valve member cooperable with said valve seat adapted to open and close said valve passage; stem means connected with said valve member extending through one of said mandrels adapted to yieldably contact with a well casing and operative for moving said valve member to positions relative to said valve seat to open and close said valve passage upon a predetermined shift in position of the tool in the well casing; packers on the respective mandrels cooperable with the well casing to provide a space forming an annular chamber therebetween surrounding said valve housing; means in said tool establishing communication between the interior of said lower mandrel and the portion of said valve passage above said valve seat and with the exterior of said lower mandrel at the side of the packer thereon remote from said annular chamber, said upper mandrel having a passage opening into and in direct communication with said annular chamber; and a by-pass duct in said upper mandrel having its lower end in communication with said valve passage and also communicating with the exterior of said upper mandrel at the side of the packer thereon remote from said annular chamber, said valve housing having a port establishing communication between said valve passage and said annular chamber on the lower side of said valve seat.

6. A fluid control tool for a well casing, comprising: an upper tubular mandrel and a lower tubular mandrel; a valve housing disposed between and connected with said mandrels and having a passageway therethrough communicating at its lower end with the interior of said lower mandrel, said valve housing also having a valve passage communicating with the upper end of said passageway; a valve seat in said valve passage intermediate its ends; a valve member in said valve passage movable into sealing engagement with said valve seat; valve stem means directly connected with said valve member including an element extending to a location exteriorly of said tool and adapted to frictionally engage with the interior of a well casing to hold said valve member while said tool is being moved in one direction relative to said well casing; packers on the respective mandrels cooperable with said well casing to provide a space forming an annular chamber surrounding said valve housing, said upper mandrel having a passage closed against direct communication with said valve housing but opening into said chamber; a by-pass duct in said upper mandrel in communication with both said passageway and said valve passage of said housing and with the exterior of said upper mandrel on the side of the packer thereon remote from said valve seat, said valve housing having a port establishing communication between said valve passage and said chamber on the side of said valve seat remote from said by-pass duct; means providing a passage from the interior of said lower mandrel to the exterior of said lower mandrel on the side of the packer thereon remote from said chamber; valve means controlling flow through said last-mentioned passage, said valve means including a valve member actuatable to open and closed positions by movement of the tool relative thereto in a direction different from that required to actuate said first-mentioned valve member; and means for optionally connecting said element with said second-mentioned valve member to hold the same while said tool is being moved in said different direction, whereby said valve members can be selectively actuated to open and closed positions upon predetermined movements of the tool with respect to the well casing.

7. A tool as defined in claim 6, in which the valve stem means includes two stem sections, one connected with the first-mentioned valve member and the other with the element of the valve stem means that frictionally engages the well casing; and means providing a lost-motion connection between said stem sections.

8. A tool as defined in claim 6, in which the valve member that is directly connected with the valve stem means is normally maintained stationary relative to the well casing by the element of the valve stem means which frictionally engages the casing and assumes an open or closed position upon up or down movement of the tool relative to the well casing; and in which the valve member that is optionally connectable with the element of the valve stem means which frictionally engages the casing is threadedly mounted on the tool and is moved from open to closed position and vice versa while restrained against rotation relative to said tool by said element when said tool is rotated in opposite directions relative to the well casing.

9. A fluid control tool for a well casing, comprising: an upper tubular mandrel and a lower tubular mandrel; a housing disposed between and connected with said mandrels; a valve structure in said housing having a valve passage; a valve seat in said valve passage between the ends thereof; a valve member cooperable with said seat to open and close said valve passage; means for moving said valve member relative to said valve seat; packers on the respective mandrels cooperable with a well casing to provide a space forming an annular chamber surrounding said valve housing; port means in said valve structure establishing communication between said chamber and said valve passage in a region below said valve seat, said upper mandrel having a passage closed against direct communication with said valve housing but opening into said chamber; a by-pass duct in said upper mandrel in communication with the upper end of said valve passage and with the exterior of said upper mandrel on the side of the packer thereon remote from said valve seat, said housing having a passageway by-passing said valve member and establishing communication between said by-pass duct and the interior of said lower mandrel; means providing a passage from the interior of said lower mandrel to the exterior of said lower mandrel on the side of the packer thereon remote from said chamber; valve means controlling flow through said last-mentioned passage; and means for operating said valve means to control said flow.

EVERETT J. GRAY.

REFERENCES CITED

The following references are of record in the file of this patent:

UNITED STATES PATENTS

| Number | Name | Date |
|---|---|---|
| 2,248,169 | Granger | July 8, 1941 |
| 2,326,940 | Granger | Aug. 17, 1943 |